US010986158B2

(12) United States Patent
Iuliano (10) Patent No.: US 10,986,158 B2
(45) Date of Patent: Apr. 20, 2021

(54) CANCELLATION MANAGEMENT WITH RESPECT TO A WEB APPLICATION (71) Applicant: INTERNATIONAL BUSINESS MACHINES CORPORATION, Armonk, NY (US)

(72) Inventor: James A. Iuliano, Everett, WA (US)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 16/572,888

(22) Filed: Sep. 17, 2019

(65) Prior Publication Data
US 2020/0014743 A1 Jan. 9, 2020

Related U.S. Application Data (63) Continuation of application No. 15/081,900, filed on Mar. 27, 2016, now abandoned.

(51) Int. Cl.
H04L 29/08 (2006.01)

(52) U.S. Cl.
CPC ............ *H04L 67/02* (2013.01); *H04L 67/025* (2013.01); *H04L 67/143* (2013.01); *H04L 67/146* (2013.01); *H04L 67/16* (2013.01); *H04L 67/32* (2013.01); *H04L 67/327* (2013.01)

(58) Field of Classification Search
CPC ....... H04L 67/02; H04L 67/146; H04L 67/32; H04L 67/025; H04L 67/143; H04L 67/327; H04L 67/16
See application file for complete search history.

(56) References Cited

U.S. PATENT DOCUMENTS

| 5,542,088 | A  | * | 7/1996  | Jennings, Jr. ......... G06F 9/4881 718/103 |
| 6,298,352 | B1 | * | 10/2001 | Kannan ............... H04M 3/4931 |
| 7,843,869 | B2 |   | 11/2010 | Ikawa |
| 7,849,467 | B2 |   | 12/2010 | Sharpe |
| 8,607,233 | B2 |   | 12/2013 | Ryman |
| 8,880,657 | B1 | * | 11/2014 | Angrish ............. H04L 12/4645 709/220 |
| 9,846,868 | B2 |   | 12/2017 | Ferlin |
| 2002/0143819 | A1 | * | 10/2002 | Han ...................... G06F 16/958 715/237 |
| 2003/0051062 | A1 | * | 3/2003  | Circenis ................. G06F 9/542 719/310 |
| 2004/0153992 | A1 | * | 8/2004  | Molina-Moreno ....... G06F 8/35 717/105 |

(Continued)

OTHER PUBLICATIONS

IBM: List of IBM Patents or Patent Applications Treated As Related (Appendix P), Oct. 15, 2019, pp. 1-2.

(Continued)

*Primary Examiner* — Aaron N Strange
(74) *Attorney, Agent, or Firm* — Robert C. Bunker (57) ABSTRACT Disclosed aspects relate to cancellation management with respect to a web application. A service request is received by the web application. An identifier for the service request is established. A cancellation request for the service request is received by the web application. Using the identifier, a termination of the service request is initiated. In embodiments, the termination of the service request is performed to free a set of computing resources such as bandwidth, processing, or memory.

20 Claims, 5 Drawing Sheets (56) References Cited

U.S. PATENT DOCUMENTS

| | | |
|---|---|---|
| 2005/0203952 A1 | 9/2005 | Deily |
| 2007/0100967 A1* | 5/2007 | Smith ........................ G06F 8/20 |
| | | 709/219 |
| 2010/0318667 A1* | 12/2010 | Miller ..................... H04L 69/14 |
| | | 709/228 |
| 2010/0318988 A1* | 12/2010 | Barr .......................... G06F 8/60 |
| | | 717/178 |
| 2016/0148306 A1 | 5/2016 | Bellavance et al. |
| 2017/0126580 A1* | 5/2017 | Lo ........................ H04L 41/0631 |
| 2017/0279924 A1 | 9/2017 | Iuliano |
| 2018/0096290 A1 | 4/2018 | Awad et al. |

OTHER PUBLICATIONS

IBM, "IBM Content Navigator, Version 2.0.3 Fix Pack 5 Readme," IBM Knowledge Center, Sep. 30, 2015, p. 1-70, http://WWW.ibm.com/support/knowledgecenter/SSEUEX_2.0.3/readme/icn_fixpack2.0.3.500_readme.html?lang=en.

* cited by examiner

CANCELLATION MANAGEMENT WITH RESPECT TO A WEB APPLICATION

STATEMENT REGARDING PRIOR DISCLOSURES BY THE INVENTOR OR A JOINT INVENTOR

The following disclosure(s) are submitted under 35 U.S.C. 102(b)(1)(A): IBM Content Navigator 2.0.3 Fix Pack 005, Sep. 26, 2015.

BACKGROUND

This disclosure relates generally to computer systems and, more particularly, relates to cancellation management with respect to a web application. The amount of data that needs to be managed by enterprises is increasing. Management of web applications may be desired to be performed with as efficiently as possible. As data needing to be managed increases, the need for management efficiency may increase.

SUMMARY

Aspects of the disclosure relate to implementing a protocol at an application network layer that allows a web client to signal to a connected web application server that a prior request has been canceled, and that associated computing resources are no longer needed. As described herein, the web client may assign a unique identifier to a Hypertext Transfer Protocol (HTTP) request sent to the server. In response to a request to cancel the HTTP request, a secondary HTTP request can then be sent which has the unique identifier of the HTTP request to be canceled. Accordingly, the unique identifier can be used to signal to the HTTP request which is executing on the server that service(s) related to the HTTP request is no longer needed. The HTTP request which was executing can then terminate and clean-up its resources to free such resources for other service requests.

Aspects of the disclosure relate to cancellation management with respect to a web application. A service request is received by the web application. An identifier for the service request is established. A cancellation request for the service request is received by the web application. Using the identifier, a termination of the service request is initiated. In embodiments, the termination of the service request is performed to free a set of computing resources such as bandwidth, processing, or memory.

The above summary is not intended to describe each illustrated embodiment or every implementation of the present disclosure.

BRIEF DESCRIPTION OF THE SEVERAL VIEWS OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the disclosure relate to implementing a protocol at an application network layer that allows a web client to signal to a connected web application server that a prior request has been canceled, and that associated computing resources are no longer needed. As described herein, the web client may assign a unique identifier to a Hypertext Transfer Protocol (HTTP) request sent to the server. In response to a request to cancel the HTTP request, a secondary HTTP request can then be sent which has the unique identifier of the HTTP request to be canceled. Accordingly, the unique identifier can be used to signal to the HTTP request which is executing on the server that service(s) related to the HTTP request is no longer needed. The HTTP request which was executing can then terminate and clean-up its resources to free such resources for other service requests.

In large scale Enterprise Content Management (ECM) web application deployments, complex document processing requests may be initiated, and, at some future point, no longer be needed. These requests may be long-running by HTTP standards or require significant computing resources (e.g., processor, memory, disk) to complete. Without request cancellation, challenges are presented with respect to the HTTP protocol to inform the server that resources in use are no longer needed. Having the ability to terminate (or disregard) these requests (should they no longer be desired) would allow computing resources which may be shared (e.g., with other requests/jobs/workloads) to be released and thereby available to take-on other tasks. Such ability may have positive impacts with respect to scalability or the like.

Aspects of the disclosure relate to cancellation management with respect to a web application. A service request is received by the web application. An identifier for the service request is established. A cancellation request for the service request is received by the web application. Using the identifier, a termination of the service request is initiated. In embodiments, the termination of the service request is performed to free a set of computing resources such as bandwidth, processing, or memory. As described herein, aspects may be related to Java Servlet/J2EE (trademark of Oracle Corporation and/or its affiliates), rich web (or web 2.0) applications, AJAX web development techniques, HTTP protocol, RESTful web services which use representational state transfer, or the like.

Aspects of the disclosure include cancellable requests subscribing/registering to be notified of cancellation (e.g., by request identifier). In response, the cancellation service can publish (e.g., send a notification) using the request identifier (e.g., indexed lookup), to signal to subscribers that a cancellation request was received. Altogether, aspects of the disclosure may have various performance or efficiency benefits (e.g., wear-rate, service-length, speed, flexibility, load balancing, responsiveness, high availability, resource usage, productivity). Aspects may save resources such as bandwidth, processing, or memory.

Figure 1:
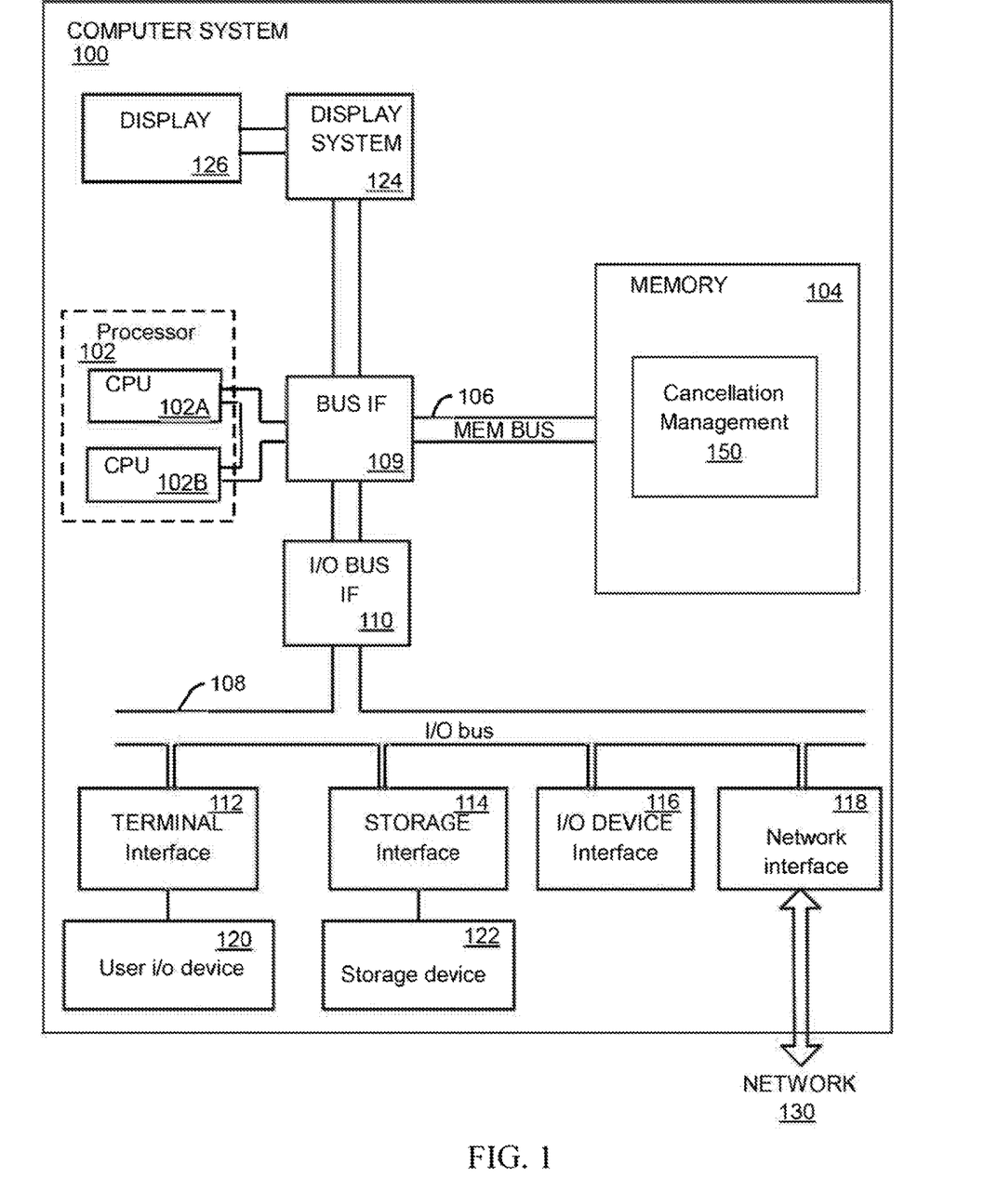
FIG. 1 depicts a high-level block diagram of a computer system for implementing various embodiments of the present disclosure.

Turning now to the figures, FIG. 1 depicts a high-level block diagram of a computer system for implementing various embodiments of the present disclosure, consistent with various embodiments. The mechanisms and apparatus of the various embodiments disclosed herein apply equally to any appropriate computing system. The major components of the computer system 100 include one or more processors 102, a memory 104, a terminal interface 112, a storage interface 114, an I/O (Input/Output) device interface 116, and a network interface 118, all of which are communicatively coupled, directly or indirectly, for inter-component communication via a memory bus 106, an I/O bus 108, bus interface unit 109, and an I/O bus interface unit 110.

The computer system 100 may contain one or more general-purpose programmable central processing units (CPUs) 102A and 102B, herein generically referred to as the processor 102. In embodiments, the computer system 100 may contain multiple processors; however, in certain embodiments, the computer system 100 may alternatively be a single CPU system. Each processor 102 executes instructions stored in the memory 104 and may include one or more levels of on-board cache.

In embodiments, the memory 104 may include a random-access semiconductor memory, storage device, or storage medium (either volatile or non-volatile) for storing or encoding data and programs. In certain embodiments, the memory 104 represents the entire virtual memory of the computer system 100, and may also include the virtual memory of other computer systems coupled to the computer system 100 or connected via a network. The memory 104 can be conceptually viewed as a single monolithic entity, but in other embodiments the memory 104 is a more complex arrangement, such as a hierarchy of caches and other memory devices. For example, memory may exist in multiple levels of caches, and these caches may be further divided by function, so that one cache holds instructions while another holds non-instruction data, which is used by the processor or processors. Memory may be further distributed and associated with different CPUs or sets of CPUs, as is known in any of various so-called non-uniform memory access (NUMA) computer architectures.

The memory 104 may store all or a portion of the various programs, modules and data structures for processing data transfers as discussed herein. For instance, the memory 104 can store a cancellation management application 150. In embodiments, the cancellation management application 150 may include instructions or statements that execute on the processor 102 or instructions or statements that are interpreted by instructions or statements that execute on the processor 102 to carry out the functions as further described below. In certain embodiments, the cancellation management application 150 is implemented in hardware via semiconductor devices, chips, logical gates, circuits, circuit cards, and/or other physical hardware devices in lieu of, or in addition to, a processor-based system. In embodiments, the cancellation management application 150 may include data in addition to instructions or statements.

The computer system 100 may include a bus interface unit 109 to handle communications among the processor 102, the memory 104, a display system 124, and the I/O bus interface unit 110. The I/O bus interface unit 110 may be coupled with the I/O bus 108 for transferring data to and from the various I/O units. The I/O bus interface unit 110 communicates with multiple I/O interface units 112, 114, 116, and 118, which are also known as I/O processors (IOPs) or I/O adapters (IOAs), through the I/O bus 108. The display system 124 may include a display controller, a display memory, or both. The display controller may provide video, audio, or both types of data to a display device 126. The display memory may be a dedicated memory for buffering video data. The display system 124 may be coupled with a display device 126, such as a standalone display screen, computer monitor, television, or a tablet or handheld device display. In one embodiment, the display device 126 may include one or more speakers for rendering audio. Alternatively, one or more speakers for rendering audio may be coupled with an I/O interface unit. In alternate embodiments, one or more of the functions provided by the display system 124 may be on board an integrated circuit that also includes the processor 102. In addition, one or more of the functions provided by the bus interface unit 109 may be on board an integrated circuit that also includes the processor 102.

The I/O interface units support communication with a variety of storage and I/O devices. For example, the terminal interface unit 112 supports the attachment of one or more user I/O devices 120, which may include user output devices (such as a video display device, speaker, and/or television set) and user input devices (such as a keyboard, mouse, keypad, touchpad, trackball, buttons, light pen, or other pointing device). A user may manipulate the user input devices using a user interface, in order to provide input data and commands to the user I/O device 120 and the computer system 100, and may receive output data via the user output devices. For example, a user interface may be presented via the user I/O device 120, such as displayed on a display device, played via a speaker, or printed via a printer.

The storage interface 114 supports the attachment of one or more disk drives or direct access storage devices 122 (which are typically rotating magnetic disk drive storage devices, although they could alternatively be other storage devices, including arrays of disk drives configured to appear as a single large storage device to a host computer, or solid-state drives, such as flash memory). In some embodiments, the storage device 122 may be implemented via any type of secondary storage device. The contents of the memory 104, or any portion thereof, may be stored to and retrieved from the storage device 122 as needed. The I/O device interface 116 provides an interface to any of various other I/O devices or devices of other types, such as printers or fax machines. The network interface 118 provides one or more communication paths from the computer system 100 to other digital devices and computer systems; these communication paths may include, e.g., one or more networks 130.

Although the computer system 100 shown in FIG. 1 illustrates a particular bus structure providing a direct communication path among the processors 102, the memory 104, the bus interface 109, the display system 124, and the I/O bus interface unit 110, in alternative embodiments the computer system 100 may include different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface unit 110 and the I/O bus 108 are shown as single respective units, the computer system 100 may, in fact, contain multiple I/O bus interface units 110 and/or multiple I/O buses 108. While multiple I/O interface units are shown, which separate the I/O bus 108 from various communications paths running to the various I/O devices, in other embodiments, some or all of the I/O devices are connected directly to one or more system I/O buses.

In various embodiments, the computer system 100 is a multi-user mainframe computer system, a single-user system, or a server computer or similar device that has little or no direct user interface, but receives requests from other computer systems (clients). In other embodiments, the computer system 100 may be implemented as a desktop computer, portable computer, laptop or notebook computer, tablet computer, pocket computer, telephone, smart phone, or any other suitable type of electronic device.

FIG. 1 depicts several major components of the computer system 100. Individual components, however, may have greater complexity than represented in FIG. 1, components other than or in addition to those shown in FIG. 1 may be present, and the number, type, and configuration of such components may vary. Several particular examples of additional complexity or additional variations are disclosed herein; these are by way of example only and are not necessarily the only such variations. The various program components illustrated in FIG. 1 may be implemented, in various embodiments, in a number of different manners, including using various computer applications, routines, components, programs, objects, modules, data structures, etc., which may be referred to herein as "software," "computer programs," or simply "programs."

Figure 2:
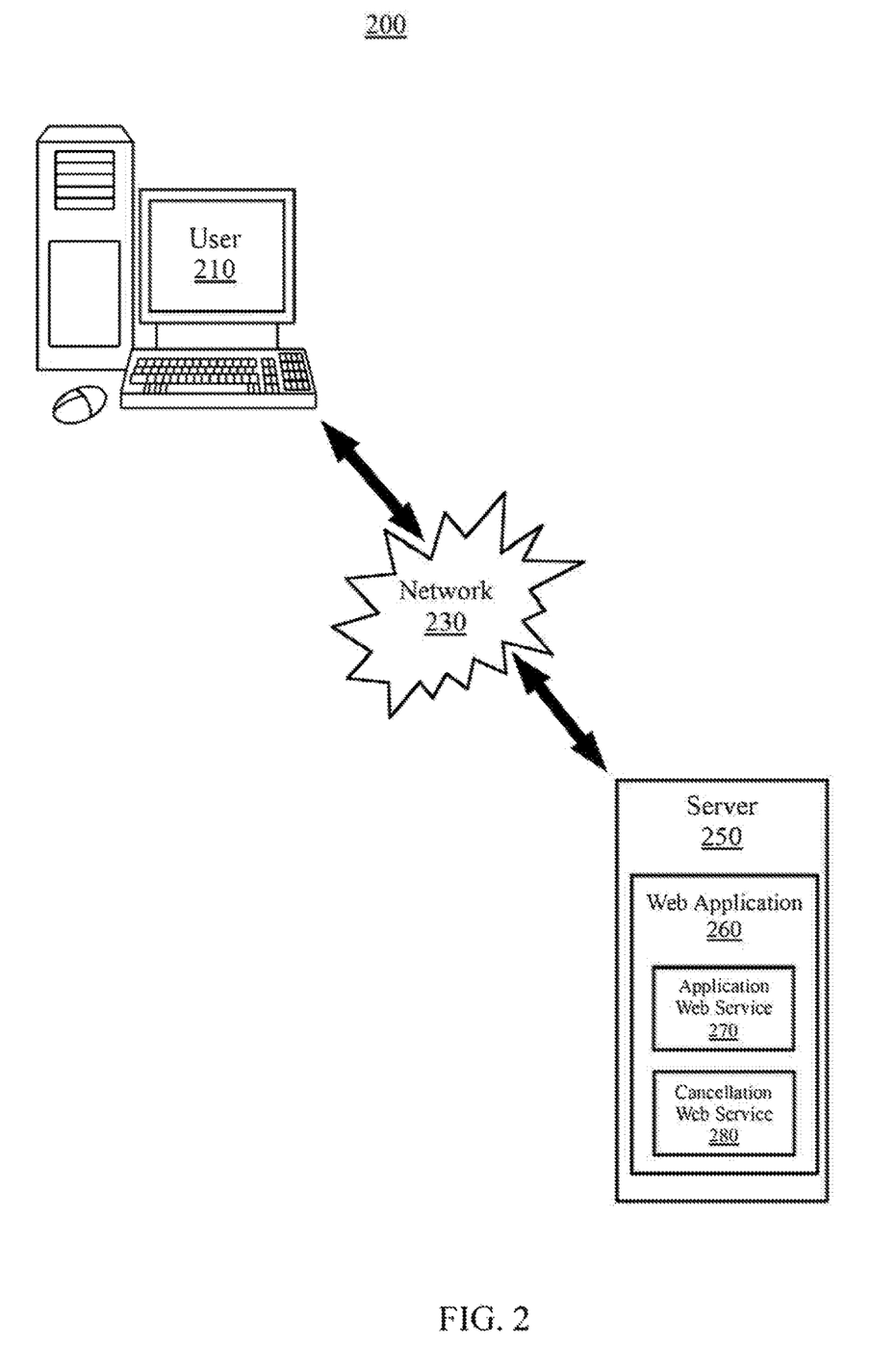
FIG. 2 is a diagrammatic illustration of an example system for implementing cancellation management, according to embodiments.

FIG. 2 is a diagrammatic illustration of an example system 200 for implementing cancellation management, according to embodiments. The cancellation management may be consistent with the description herein including FIGS. 1-5. A user 210 (e.g., an individual interacting with a graphical user interface) may be connected via a network 230 to a server 250. The server 250 can include a web application 260 which has an application web service 270 and a cancellation web service 280. In embodiments, the web application 260 may be considered to have all such aspects in one component (e.g., the web application itself, a web client). For example, the web application 260 (e.g., and all of it's services) may be clustered (e.g., replicated to increase scalability) as a self-contained unit such that each may have it's own group of cancellable services and cancellation service. Accordingly, specific users can connect with specific copies of specific applications (e.g., while different users are connected with different copies).

Figure 3:
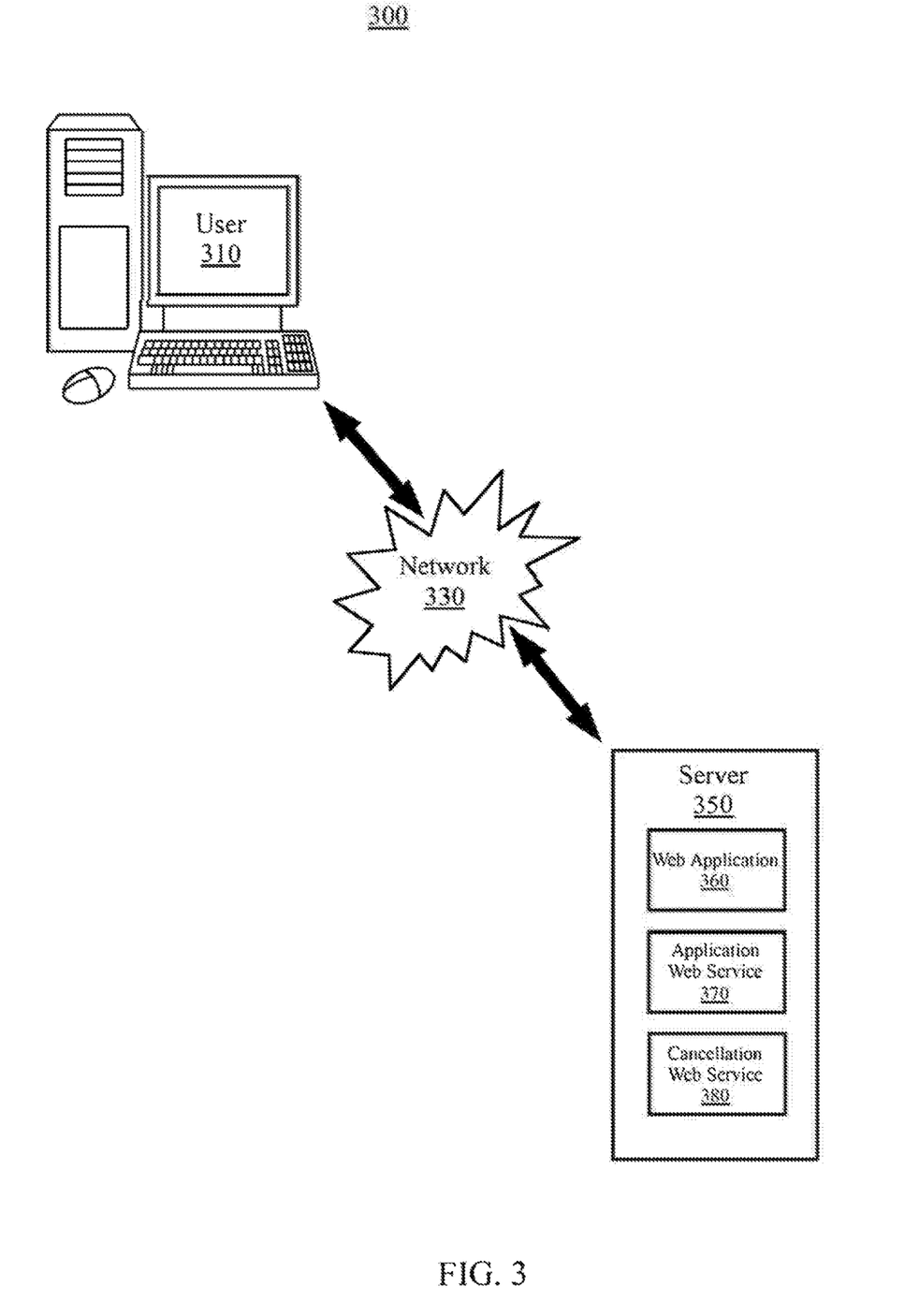
FIG. 3 is a diagrammatic illustration of an example system for implementing cancellation management, according to embodiments.

FIG. 3 is a diagrammatic illustration of an example system 300 for implementing cancellation management, according to embodiments. The cancellation management may be consistent with the description herein including FIGS. 1-5. A user 310 may be connected via a network 330 to a server 350. The server 350 can include a web application 360, an application web service 370, and a cancellation web service 380. In embodiments, the web application 360, the application web service 370, and the cancellation web service 380 may be distinct components of the (one) server 350 (or, in certain embodiments, dispersed across multiple servers such as to centralize the cancellation web service 380 on a cancellation server). Accordingly, specific users can connect with specific copies of specific applications.

Figure 4:
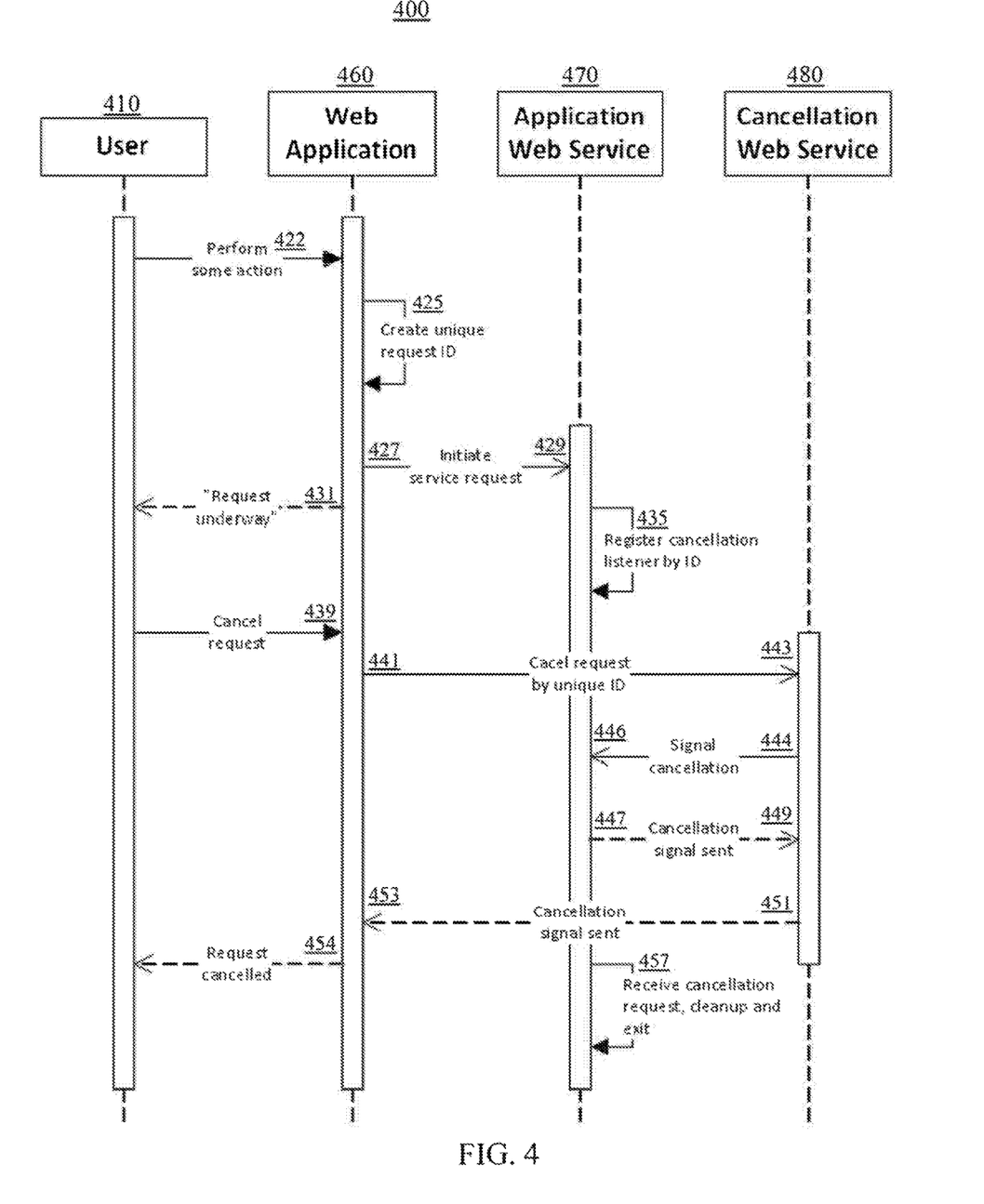
FIG. 4 is a diagrammatic illustration of a cancellation management system with respect to a web application, according to embodiments.

FIG. 4 is a diagrammatic illustration of a cancellation management system 400 with respect to a web application, according to embodiments. The cancellation management may be consistent with the description herein including FIGS. 1-5. A user 410 may connect with a web application 460. The web application 460 may have at least an association with an application web service 470 and a cancellation web service 480, which may be configured to interact with each other.

At operation 422, the web application 460 may receive a service request. The service request may have been instantiated by the user 421. The service request can include a message requesting the web application 460 to perform some action. Receiving can include sensing the message or data packet which may arrive from a requesting-user. In certain embodiments, the message may be encrypted or wrapped such that decryption or unwrapping may be applied. For example with respect to the nature of the service request, the service request can include processing of a conversion of a set of files (e.g., digital images) from a first file format to a second file format, and returning the converted set of files in the second file format back to the requesting-user. As such, the service request may initiate use of a set of computing resources (e.g., to process digital images).

At operation 425, the web application 460 can establish an identifier for the service request. Establishing the identifier can include creating, generating, or constructing a unique identifier for the service request. The identifier and the service request can be coupled together in a data object. The unique identifier may be specific to the requesting-user and the web application 460 (in addition to the service request). For instance, the identifier can distinguish one or more duplicate or similar service requests from a requesting-user to facilitate cancellation of such redundant service requests.

In embodiments, the web application 460 may initiate an execution of the service request at operation 427. For example, processing of a digital image (or another resource intensive technical procedure) may begin or be scheduled (e.g., based on availability/efficiency of computing resources such as processor, memory, or disk). The service request may have the identifier (e.g., wrapped/packaged in/with it). In embodiments, the application web service 470 may detect the initiation of the execution of the service request (which has the identifier) at operation 429. As such, the application web service 470 can be configured to subsequently initiate a set of operations to carry-out the service request.

In embodiments, the web application 460 may transmit an execution initiation notification to a requesting-user of the service request at operation 431. The execution initiation notification may be related to an initiation of an execution of the service request. The execution initiation notification can have the identifier. As such, a dialog box may be provided to the requesting-user having the status of the service request, a cancellation button to facilitate cancellation if selected by the requesting-user, and the identifier of the service request to similarly facilitate cancellation or tracking by the requesting-user. Other possibilities are also contemplated.

In embodiments, the application web service 470 may establish (e.g., register, create, generate, construct) a cancellation monitor at operation 435. The cancellation monitor can utilize the identifier to monitor or listen for an indication (e.g., a message or data packet) of the cancellation request. As such, the cancellation monitor can use a comparison technique to determine whether identifiers match (e.g., ABC14 & ABC14) or mismatch (e.g., DEF23 & HIJ68).

At operation 439, the web application 460 may receive a cancellation request for the service request. The cancellation request may be accepted or sensed from the requesting-user. In embodiments, the cancellation request can include the identifier of the service request to facilitate cancellation/ termination of the service request. For example, the requesting user may have submitted multiple service requests. After a temporal period, the requesting user may submit a cancellation request for one of the service requests which is received by the web application 460 (using the identifier to indicate the appropriate service request to cancel or terminate).

At operation 441, in response to detecting the cancellation request, the web application 460 may use the identifier to initiate a termination of the service request. The identifier of the service request and an identifier of the cancellation request may be compared. When the identifiers match, termination of the service request may be initiated. If the identifiers do not match, another service request may be compared with the cancellation request. For example, a digital image processing operation having a particular identifier may be underway when a cancellation request is detected with the particular identifier. As such, termination of the digital image processing operation may be triggered by selecting a feature which stops associated processor, memory, or disk usage.

In embodiments, the initiation of the termination of the service request can be detected at operation 443. Detection can occur using the identifier with respect to the cancellation web service 480 (e.g., by comparison of the identifiers to determine whether a match exists). In embodiments, a termination initiation request (e.g., message, signal, data packet) can be transmitted or sent at operation 444. The termination initiation request can be transmitted by the cancellation web service 480 (related to the initiation of the termination of the service request).

In embodiments, the initiation of the termination of the service request can be detected (e.g., a message with a command to commence stopping of processing) by the application web service at operation 446 (e.g., using the cancellation monitor, based on matching identifiers). In embodiments, a termination initiation notification (e.g., verifying that the message having the command has been received) can be transmitted or sent at operation 447. The termination initiation notification may be transmitted by the application web service 470 (related to the initiation of the termination of the service request). In embodiments, the termination initiation notification can be detected at operation 449. The termination initiation notification may be detected by the cancellation web service 480 (related to the initiation of the termination of the service request). As such, for example, usage of computing resources associated with the service request such as processors, memory, or disk may be indicated to be wound-down or stopped.

In embodiments, a termination initiation notification (e.g., within or to the web application 460) can be transmitted at operation 451. The termination initiation notification (e.g., publicizing the service request is stopped, being stopped, or scheduled to be stopped) may be transmitted by the cancellation web service 480 (related to the initiation of the termination of the service request). In embodiments, a confirmation of the initiation of the termination of the service request may be detected or sensed at operation 453. The detection may be made by the web application 460 in response to initiating the termination of the service request (at operation 441). In embodiments, a termination initiation notification (e.g., message, displayed dialogue box) can be transmitted or sent to a requesting-user of the service request at operation 454. The termination initiation notification may be transmitted or sent by the web application 460 (related to the initiation of the termination of the service request). In certain embodiments, the termination initiation notification can include the identifier for tracking by the requesting-user or the like.

In embodiments, the termination of the service request is performed at operation 457. The termination of the service request can occur in response to detecting initiation of the termination of the service request at operation 446. The termination of the service request may be carried-out by the application web service 470. The termination of the service request can free a set of computing resources (e.g., network traffic may be reduced, available bandwidth can be increased, memory may become available, processing power can be applied elsewhere, disk space may be freed). The service request may be cleaned-up (e.g., disabling threads, ending processes, deleting temporary files), diagnostic data may be written to a data store, and the procedure may exit.

Figure 5:
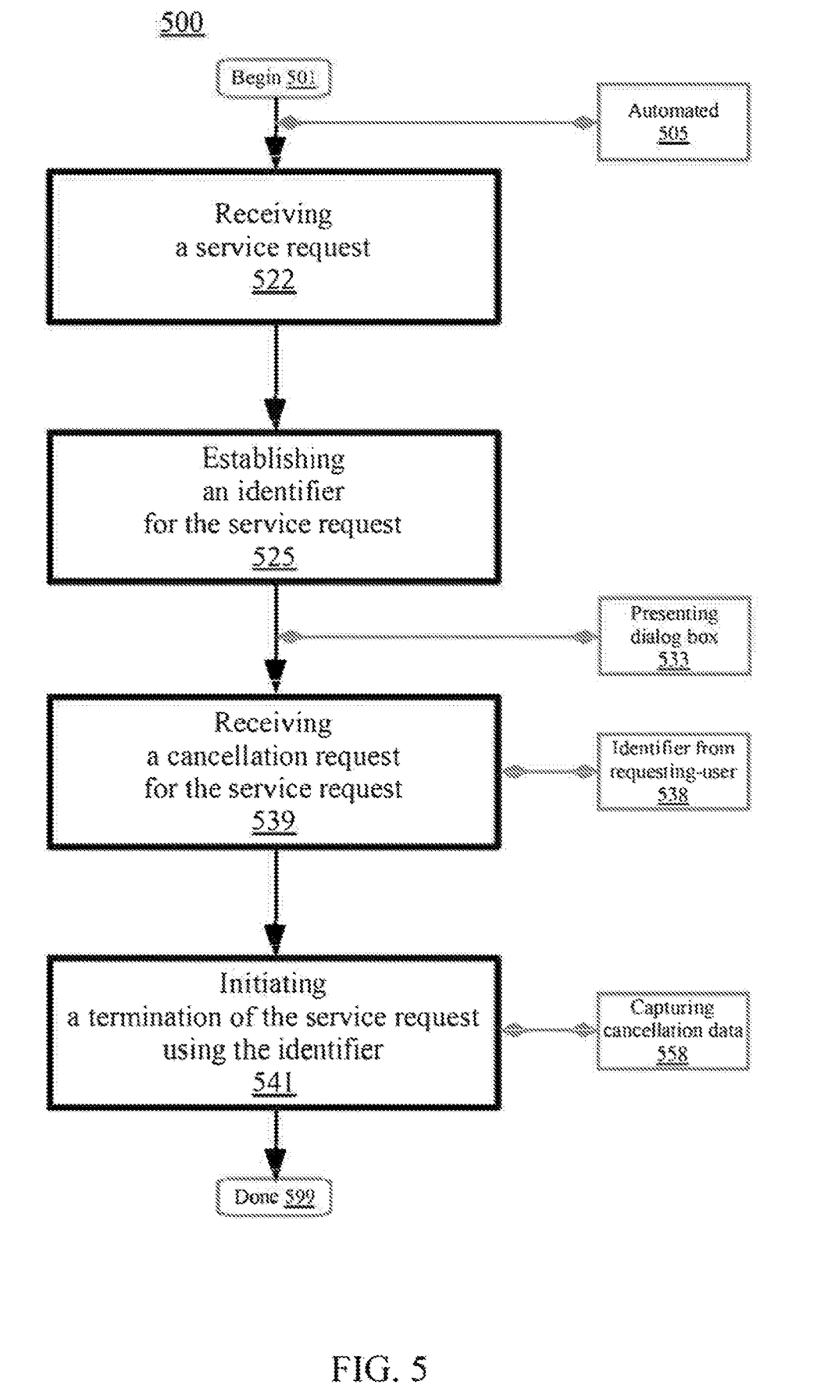
FIG. 5 is a flowchart illustrating a method for cancellation management with respect to a web application, according to embodiments.

FIG. 5 is a flowchart illustrating a method 500 for cancellation management with respect to a web application, according to embodiments. The cancellation management may be consistent with the description herein including FIGS. 1-5. The method may begin at block 501. In embodiments, the operational steps (e.g., the receiving of the service request, the establishing of the identifier, the receiving of the cancellation request, and the initiating of the termination of the service request) each occur in an automated fashion without user intervention at block 505. At block 522, a service request may be received by a web application. At block 525, an identifier for the service request can be established by the web application. At block 539, a cancellation request for the service request may be received by the web application. At block 541, a termination of the service request is initiated using the identifier (by the web application in response to detecting the cancellation request).

In various embodiments, a requesting-user of the service request may be connected or linked directly with the web application. In certain embodiments, other users may not be connected to the exact same (image, representation, or copy of) the web application. The service request can correspond with a preexisting service request from the requesting-user (e.g., same type of request, a threshold number/percentage of files being accessed are identical such as more than 80%, a duplicate request at a different point in time). The service request and the preexisting service request can share a set of common elements (e.g., requesting a same/similar set of processed files once and then again within a temporal period, accessing identical digital images for processing).

In embodiments, a dialog box is presented or displayed at block 533. The dialog box can have a cancellation facilitation feature (e.g., an interface button while the service request is displayed or presented to be spinning, processing, or the like) which allows for a requesting-user of the service request to initiate a cancellation. The dialog box may be presented by the web application in response to receiving the service request. In embodiments, the cancellation request both includes the identifier and is received from a requesting-user of the service request at block 538.

In embodiments, a set of cancellation data is captured by a cancellation web service at block 558. The set of cancellation data may be stored with information such as a count of a number of subscribers a particular termination request was sent to or to track a number of cancels (e.g., for metrics to provide a customer with respect to computing resource usage). The method may conclude at block 599. Aspects of the method 500 (or related aspects of system 400) may have performance or efficiency benefits such as hardware resource usage, high availability, speed, or scalability.

Disclosed aspects allow utilization of an application program interface (API) to make a call that can be modified to self-regulate via a publish/subscribe model. Accordingly, a developer can modify each individual service to subscribe/listen for cancellation requests (e.g., abort signals) in a manner appropriate to the service. As described herein, the requesting-user can issue a cancellation request interactively within their own application context. If their service request is taking too long, the requesting-user can cancel, and the related services may be terminated. Aspects relate to disparate, distributed system components (e.g., web client, web application services) and abort/termination signaling/messaging.

In addition to embodiments described above, other embodiments having fewer operational steps, more operational steps, or different operational steps are contemplated. Also, some embodiments may perform some or all of the above operational steps in a different order. The modules are listed and described illustratively according to an embodiment and are not meant to indicate necessity of a particular module or exclusivity of other potential modules (or functions/purposes as applied to a specific module).

In the foregoing, reference is made to various embodiments. It should be understood, however, that this disclosure is not limited to the specifically described embodiments. Instead, any combination of the described features and elements, whether related to different embodiments or not, is contemplated to implement and practice this disclosure. Many modifications and variations may be apparent to those of ordinary skill in the art without departing from the scope and spirit of the described embodiments. Furthermore, although embodiments of this disclosure may achieve advantages over other possible solutions or over the prior art, whether or not a particular advantage is achieved by a given embodiment is not limiting of this disclosure. Thus, the described aspects, features, embodiments, and advantages are merely illustrative and are not considered elements or limitations of the appended claims except where explicitly recited in a claim(s).

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

Embodiments according to this disclosure may be provided to end-users through a cloud-computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud-computing resources are provided to a user on a pay-per-use basis, where users are charged only for the computing resources actually used (e.g., an amount of storage space used by a user or a number of virtualized systems instantiated by the user). A user can access any of the resources that reside in the cloud at any time, and from anywhere across the Internet. In context of the present disclosure, a user may access applications or related data available in the cloud. For example, the nodes used to create a stream computing application may be virtual machines hosted by a cloud service provider. Doing so allows a user to access this information from any computing system attached to a network connected to the cloud (e.g., the Internet).

Embodiments of the present disclosure may also be delivered as part of a service engagement with a client corporation, nonprofit organization, government entity, internal organizational structure, or the like. These embodiments may include configuring a computer system to perform, and deploying software, hardware, and web services that implement, some or all of the methods described herein. These embodiments may also include analyzing the client's operations, creating recommendations responsive to the analysis, building systems that implement portions of the recommendations, integrating the systems into existing processes and infrastructure, metering use of the systems, allocating expenses to users of the systems, and billing for use of the systems.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing is directed to exemplary embodiments, other and further embodiments of the invention may be devised without departing from the basic scope thereof, and the scope thereof is determined by the claims that follow. The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A computer-implemented method comprising:
    receiving, by a web application, a service request to process data from a requesting-user, wherein the web application uses an external application web service to process the data in response to the received service request;
    subscribing the received service request to a cancellation web service;
    establishing, by the web application, an identifier for the service request;
    executing, by the external application web service, the service request which has the identifier;
    presenting, by the web application in response to receiving the service request, a cancellation facilitation feature to the requesting-user of the service request;
    receiving, by the web application in response to the requesting-user activating the presented cancellation facilitation feature a cancellation request for the service request; and
    initiating, by the web application using the identifier, a termination of the service request in response to detecting the cancellation request, wherein the web application uses the cancellation service to publish the cancellation request with the identifier to a plurality of subscriber services including the subscribed service request.

2. The method of claim 1, further comprising:
    initiating, by the web application, an execution of the service request which has the identifier; and
    detecting, with respect to the external application web service, the initiation of the execution of the service request which has the identifier.

3. The method of claim 1, further comprising:
    transmitting, by the web application related to an initiation of an execution of the service request, an execution initiation notification which has the identifier to the requesting-user of the service request.

4. The method of claim 1, further comprising:
establishing, with respect to the external application web service, a cancellation monitor which utilizes the identifier to monitor for an indication of the cancellation request.

5. The method of claim 1, further comprising:
detecting, using the identifier with respect to the cancellation web service, the initiation of the termination of the service request.

6. The method of claim 1, further comprising:
transmitting, with respect to the cancellation web service related to the initiation of the termination of the service request, a termination initiation request.

7. The method of claim 1, further comprising:
detecting, with respect to the external application web service, the initiation of the termination of the service request.

8. The method of claim 1, further comprising:
transmitting, with respect to the external application web service related to the initiation of the termination of the service request, a termination initiation notification.

9. The method of claim 1, further comprising:
detecting, with respect to the cancellation web service related to the initiation of the termination of the service request, a termination initiation notification.

10. The method of claim 1, further comprising:
transmitting, with respect to the cancellation web service related to the initiation of the termination of the service request, a termination initiation notification.

11. The method of claim 1, further comprising:
detecting, by the web application in response to initiating the termination of the service request, a confirmation of the initiation of the termination of the service request.

12. The method of claim 1, further comprising:
transmitting, by the web application related to the initiation of the termination of the service request, a termination initiation notification to the requesting-user of the service request.

13. The method of claim 1, further comprising:
performing, with respect to the external application web service, the termination of the service request to free a set of computing resources.

14. The method of claim 1, wherein the cancellation request both includes the identifier and is received from a requesting-user of the service request.

15. The method of claim 1, further comprising:
capturing, with respect to the cancellation web service, a set of cancellation data.

16. The method of claim 1, wherein the requesting-user of the service request is connected with the web application, wherein the service request corresponds with a preexisting service request from the requesting-user, and wherein the service request and the preexisting service request share a set of common elements.

17. The method of claim 1, wherein the receiving of the service request, the establishing of the identifier, the receiving of the cancellation request, and the initiating of the termination of the service request each occur in an automated fashion without user intervention.

18. A system comprising:
a memory having a set of computer readable computer instructions, and
a processor for executing the set of computer readable instructions, the set of computer readable instructions including:
receiving, by a web application, a service request to process data from a requesting-user, wherein the web application uses an external application web service to process the data in response to the received service request;
subscribing the received service request to a cancellation service;
establishing, by the web application, an identifier for the service request;
executing, by the external application web service, the service request which has the identifier;
presenting, by the web application in response to receiving the service request, a cancellation facilitation feature to the requesting-user of the service request;
receiving, by the web application in response to the requesting-user activating the presented cancellation facilitation feature a cancellation request for the service request; and
initiating, by the web application using the identifier, a termination of the service request in response to detecting the cancellation request, wherein the web application uses the cancellation service to publish the cancellation request with the identifier to a plurality of subscriber services including the subscribed service request.

19. The system of claim 18, further comprising:
initiating, by the web application, an execution of the service request which has the identifier; and
detecting, with respect to the external application web service, the initiation of the execution of the service request which has the identifier.

20. A computer program product comprising a computer readable storage medium having program instructions embodied therewith, wherein the computer readable storage medium is not a transitory signal per se, the program instructions executable by a processor to cause the processor to perform a method comprising:
receiving, by a web application, a service request to process data from a requesting-user, wherein the web application uses an external application web service to process the data in response to the received service request;
subscribing the received service request to a cancellation service;
establishing, by the web application, an identifier for the service request;
executing, by the external application web service, the service request which has the identifier;
presenting, by the web application in response to receiving the service request, a cancellation facilitation feature to the requesting-user of the service request;
receiving, by the web application in response to the requesting-user activating the presented cancellation facilitation feature a cancellation request for the service request; and
initiating, by the web application using the identifier, a termination of the service request in response to detecting the cancellation request, wherein the web application uses the cancellation service to publish the cancellation request with the identifier to a plurality of subscriber services including the subscribed service request.

* * * * *